United States Patent
Yang et al.

(10) Patent No.: US 12,294,433 B2
(45) Date of Patent: May 6, 2025

(54) SIGNAL TO INTERFERENCE PLUS NOISE RATIO MEASUREMENT METHOD AND APPARATUS, DEVICE, AND MEDIUM

(71) Applicant: VIVO MOBILE COMMUNICATION CO., LTD., Dongguan (CN)

(72) Inventors: Yu Yang, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 428 days.

(21) Appl. No.: 17/726,496

(22) Filed: Apr. 21, 2022

(65) Prior Publication Data

US 2022/0247470 A1    Aug. 4, 2022

Related U.S. Application Data

(63) Continuation of application No. PCT/CN2020/126218, filed on Nov. 3, 2020.

(30) Foreign Application Priority Data

Nov. 8, 2019    (CN) .......................... 201911090449.0

(51) Int. Cl.
*H04B 7/06* (2006.01)
*H04B 17/336* (2015.01)
*H04L 5/00* (2006.01)

(52) U.S. Cl.
CPC ......... *H04B 7/0626* (2013.01); *H04B 7/0617* (2013.01); *H04B 17/336* (2015.01); *H04L 5/0092* (2013.01)

(58) Field of Classification Search
CPC .. H04B 7/0626; H04B 17/336; H04B 7/0617; H04L 5/0092
See application file for complete search history.

(56) References Cited

U.S. PATENT DOCUMENTS

2018/0115357 A1    4/2018    Park et al.
2019/0174345 A1*   6/2019    Xing ................... H04W 52/242
(Continued)

FOREIGN PATENT DOCUMENTS

CN    107172890 A    9/2017
CN    109151842 A    1/2019
(Continued)

OTHER PUBLICATIONS

International Search Report issued in corresponding International Application No. PCT/CN2020/126218, mailed Feb. 3, 2021, 4 pages.
(Continued)

*Primary Examiner* — Duc C Ho
(74) *Attorney, Agent, or Firm* — IPX PLLC (57) ABSTRACT

A signal to interference plus noise ratio measurement method, a terminal device, and a medium are provided. The signal to interference plus noise ratio measurement method includes receiving configuration information from a network side device. The signal to interference plus noise ratio measurement method further includes performing Signal to Interference plus Noise Ratio (SINR) measurement by using information that is of a Reference Signal (RS) resource used for a SINR measurement and that is included in the configuration information, where a number of measurement times of the RS resource in the SINR measurement meets a preset rule.

20 Claims, 2 Drawing Sheets

(56) References Cited

U.S. PATENT DOCUMENTS

2021/0144569 A1* 5/2021 Zhou ................. H04W 8/24
2021/0352651 A1* 11/2021 Zhou ................. H04L 5/0048

FOREIGN PATENT DOCUMENTS

| CN | 109391992 A | 2/2019 | | |
|---|---|---|---|---|
| CN | 110022192 A | 7/2019 | | |
| CN | 110050427 A | 7/2019 | | |
| EP | 3270628 A1 | 1/2018 | | |
| EP | 3547564 A1 | 10/2019 | | |
| WO | WO-2019099659 A1 * | 5/2019 | ............... | H04B 7/02 |
| WO | 2019162917 A1 | 8/2019 | | |

OTHER PUBLICATIONS

NTT DOCOMO, Inc., "RAN WG's progress on NR WI in the February meeting 2018", 3GPP TSG-RAN WG2 #101bis, R2-1804394, Apr. 20, 2018.
First Office Action issued in related Chinese Application No. 201911090449.0, mailed Aug. 25, 2021, 12 pages.

* cited by examiner

SIGNAL TO INTERFERENCE PLUS NOISE RATIO MEASUREMENT METHOD AND APPARATUS, DEVICE, AND MEDIUM

CROSS-REFERENCE TO RELATED APPLICATIONS

This application is a continuation of International Application No. PCT/CN2020/126218, filed Nov. 3, 2020, which claims priority to Chinese Patent Application No. 201911090449.0, filed Nov. 8, 2019. The entire contents of each of the above-referenced applications are expressly incorporated herein by reference.

TECHNICAL FIELD

The present disclosure relates to the field of communications technologies, and in particular, to a signal to interference plus noise ratio measurement method and apparatus, a device, and a medium.

BACKGROUND

During beam measurement and selection, Reference Signal Received Power (RSRP) is commonly used as a parameter to measure beam quality. In order to further improve accuracy of beam measurement and selection, Signal to Interference plus Noise Ratio (SINR) measurement is required especially in multi-cell, multi-user, and multi-beam scenarios, where the signal to interference plus noise ratio is referred to as SINR for short. Therefore, how to perform the signal to interference plus noise ratio measurement is an urgent problem to be solved.

SUMMARY

According to a first aspect, an embodiment of the present disclosure provides an SINR measurement method applied to a network side device, including:

sending configuration information to a terminal device, where the configuration information includes information of a Reference Signal (RS) resource used for SINR measurement, and a number of measurement times of the RS resource in the SINR measurement meets a preset rule.

According to a second aspect, an embodiment of the present disclosure provides an SINR measurement method applied to a terminal device, including:

receiving configuration information from a network side device, where the configuration information includes information of an RS resource used for SINR measurement; and performing SINR measurement by using the information that is of the RS resource used for SINR measurement and that is included in the configuration information, where a number of measurement times of the RS resource in the SINR measurement meets a preset rule.

According to a third aspect, an embodiment of the present disclosure provides an SINR measurement apparatus applied to a network side device, including:

a sending module, configured to send configuration information to a terminal device, where the configuration information includes information of an RS resource used for SINR measurement, and a number of measurement times of the RS resource in the SINR measurement meets a preset rule.

According to a fourth aspect, an embodiment of the present disclosure provides an SINR measurement apparatus applied to a terminal device, including:

a receiving module, configured to receive configuration information from a network side device, where the configuration information includes information of an RS resource used for SINR measurement; and a measurement module, configured to perform SINR measurement by using the information that is of the RS resource used for SINR measurement and that is included in the configuration information, where a number of measurement times of the RS resource in the SINR measurement meets a preset rule.

According to a fifth aspect, an embodiment of the present disclosure provides a network side device, including a memory, a processor, and a computer program stored in the memory and executable on the processor; and when the processor executes the computer program, the SINR measurement method provided in the first aspect of the embodiments of the present disclosure is implemented.

According to a sixth aspect, an embodiment of the present disclosure provides a terminal device, including a memory, a processor, and a computer program stored in the memory and executable on the processor; and when the processor executes the computer program, the SINR measurement method provided in the second aspect of the embodiments of the present disclosure is implemented.

According to a seventh aspect, an embodiment of the present disclosure provides a computer-readable storage medium. The computer-readable storage medium stores a computer program, and when the computer program is executed by a processor, the SINR measurement method provided in the first aspect or the second aspect in the embodiments of the present disclosure is implemented.

BRIEF DESCRIPTION OF DRAWINGS

To describe the technical solutions in the embodiments of the present disclosure more clearly, the following briefly describes the accompanying drawings required to be used in the embodiments of the present disclosure. A person of ordinary skill in the art may still derive other drawings from these accompanying drawings.

DETAILED DESCRIPTION OF THE EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments acquired by a person of ordinary skill in the art based on the embodiments of the present disclosure shall fall within the protection scope of the present disclosure.

Currently, during beam measurement and selection, RSRP is commonly used as a parameter to measure beam quality. In order to further improve accuracy of beam measurement and selection, an SINR is required to be measured especially in multi-cell, multi-user, and multi-beam scenarios. When a network side device is configured to measure the SINR, in addition to using a Channel Measurement Resources (CMR) to measure a channel, an Interference Measurement Resources (IMR) is also required to measure interference. In the related art, a calculation time and a quantity of Channel State Information (CSI) processing units required for an RSRP report cannot meet a calculation time and a quantity of CSI processing units required for an SINR report. Based on this, embodiments of the present disclosure provide an SINR measurement method and apparatus, a device, and a medium to measure the SINR and determine the calculation time and the quantity of CSI processing units required for the SINR report, so that a determined calculation time and quantity of CSI processing units required for the SINR report can meet requirements of SINR measurement. The following first introduces the SINR measurement method provided in the embodiments of the present disclosure.

The SINR measurement method applied to the network side device may include: sending configuration information to a terminal device. The configuration information includes information of an RS resource used for SINR measurement, and a number of measurement times of the RS resource in the SINR measurement meets a preset rule.

The network side device provided in this embodiment of the present disclosure may be a base station, and the base station may be a frequently used base station, or an evolved Node Base station (eNB), or a device such as a network side device (for example, a next generation Node Base station (gNB) or a Transmission and Reception Point (TRP)) or a cell in the 5G system, or a network side device in a subsequent evolution communications system. However, the term used does not constitute a limitation on the protection scope of the present disclosure. In some embodiments, the terminal device may be a mobile phone, a tablet computer, a smart watch, a smart home appliance, or the like, which is not limited in this embodiment of the present disclosure.

A reference signal RS is a known signal provided by a transmit end to a receive end for channel estimation or channel sounding.

In an embodiment of the present disclosure, the preset rule may be defined by a protocol or formulated by the network side device.

In an embodiment of the present disclosure, the preset rule may include:

a first quantity is not greater than a first preset quantity X, where the first quantity is a number of measurement times of an RS resource in an RS resource setting associated with an SINR report setting, and X is a positive integer.

The RS resources in the RS resource setting associated with the SINR report setting may be all RS resources in all RS resource settings associated with the SINR report setting.

In an embodiment of the present disclosure, the first quantity may be determined based on at least one of the following items:
 a quantity of RS resources with different RS resource identifiers;
 a quantity of first RS resources, where the first RS resource is an RS resource measured by using a plurality of pieces of Quasi Co-Location (QCL) information in the SINR measurement;
 a quantity of QCL information used in measuring the first RS resource;
 a measurement purpose; and
 a mapping relationship between a channel measurement resource CMR and an interference measurement resource IMR.

The measurement purpose may include channel measurement or interference measurement.

In an embodiment of the present disclosure, the first preset quantity X may include:
 a maximum quantity of RS resources that a terminal device can support on a serving cell or a Bandwidth Part (BWP); or
 a maximum quantity of RS resources that a terminal device can support on all serving cells or all bandwidth parts.

In an embodiment of the present disclosure, the preset rule may include:
 a second quantity is not greater than a second preset quantity, where the second quantity is a number of measurement times of an RS resource in each of RS resource settings associated with SINR report settings.

In an embodiment of the present disclosure, the second preset quantity may include any one of the following items:
 a maximum quantity of RS resources that a terminal device can support on a serving cell or a bandwidth part;
 a maximum quantity of RS resources that are in an RS resource setting and that a terminal device can support on a serving cell or a bandwidth part;
 a maximum quantity of RS resources that a terminal device can support on all serving cells or all bandwidth parts; and
 a maximum quantity of RS resources that are in an RS resource setting and that a terminal device can support on all serving cells or all bandwidth parts.

In an embodiment of the present disclosure, the preset rule may include:
 a third quantity is not greater than a third preset quantity, where the third quantity is a number of measurement times of an RS resource in an RS resource set of RS resource settings associated with measurement SINR report settings.

In an embodiment of the present disclosure, the third preset quantity may include any one of the following items:
 a maximum quantity of RS resources that a terminal device can support on a serving cell or a bandwidth part;
 a maximum quantity of RS resources that are in an RS resource set and that a terminal device can support on a serving cell or a bandwidth part;
 a maximum quantity of RS resources that a terminal device can support on all serving cells or all bandwidth parts; and
 a maximum quantity of RS resources that are in an RS resource set and that a terminal device can support on all serving cells or all bandwidth parts.

In an embodiment of the present disclosure, the preset rule may include:
 a fourth quantity is not greater than a fourth preset quantity, where the fourth quantity is a number of measurement times of an RS resource in an RS resource setting associated with an SINR report setting within a slot.

In an embodiment of the present disclosure, the fourth preset quantity may include any one of the following items:
 a maximum quantity of RS resources that the terminal device can support on all serving cells or all bandwidth parts within a slot;

a maximum quantity of RS resources that the terminal device can support on a serving cell or a bandwidth part within a slot; and a maximum quantity of RS resources that the terminal device can support within a slot.

In an embodiment of the present disclosure, the RS resource may include a CMR and an IMR.

In an embodiment of the present disclosure, if a quantity ratio of the CMR to the IMR is 1:1, a quantity of CMRs does not exceed X/2; if a quantity ratio of the CMR to the IMR is M:1, a quantity of IMRs does not exceed X/(M+1); and if a quantity ratio of the CMR to the IMR is 1:N, a quantity of CMRs does not exceed X/(N+1), where M and N are positive integers.

According to the SINR measurement method applied to the network side device provided in the embodiments of the present disclosure, a workload and complexity of the SINR measurement can be reduced by limiting the number of measurement times of the RS resource in the SINR measurement.

In an embodiment of the present disclosure, the SINR measurement method applied to the network side device provided in this embodiment of the present disclosure may further include: determining a calculation time of the CSI processing unit required for SINR measurement.

In an embodiment of the present disclosure, the calculation time of the CSI processing unit required for the SINR measurement may be the same as the calculation time of the CSI processing unit required for the RSRP measurement.

According to the SINR measurement method applied to the network side device provided in the embodiments of the present disclosure, the calculation time of the CSI processing unit required for the SINR measurement can meet the requirements of the SINR measurement.

In an embodiment of the present disclosure, the SINR measurement method applied to the network side device provided in this embodiment of the present disclosure may further include: determining a quantity of CSI processing units required for SINR measurement.

According to the SINR measurement method applied to the network side device provided in the embodiments of the present disclosure, the quantity of the CSI processing units required for the SINR measurement can meet the requirements of the SINR measurement.

In an embodiment of the present disclosure, the quantity of the CSI processing units required for the SINR measurement may be determined as 1.

In an embodiment of the present disclosure, the quantity of CSI processing units required for SINR measurement may further be determined based on a quantity of beams required for SINR measurement, a number of measurement times of the RS resource required for SINR measurement, and/or the calculation time of the CSI processing unit required for SINR measurement.

The number of measurement times of the RS resource required for SINR measurement is determined based on at least one of the following items:

a quantity of RS resources with different RS resource identifiers;

a quantity of first RS resources, where the first RS resource is an RS resource measured by using a plurality of pieces of QCL information in the SINR measurement;

a quantity of QCL information used in measuring the first RS resource;

a measurement purpose; and a mapping relationship between the CMR and the IMR.

In an embodiment of the present disclosure, if a quantity ratio of a CMR to an IMR is P:1, it is determined that the quantity of CSI processing units required for an SINR report as P+1; and if a quantity ratio of the CMR to the IMR is 1:Q, it is determined that the quantity of CSI processing units required for the SINR report as Q+1, where P and Q are positive integers.

In an embodiment of the present disclosure, if the quantity of beams required for SINR measurement is the same as the quantity of beams required for RSRP measurement, the quantity of CSI processing units required for SINR measurement is determined as 1, or the quantity of CSI processing units required for SINR measurement is increased.

In an embodiment of the present disclosure, if the number of measurement times of the RS resource required for SINR measurement is the same as the number of measurement times of the RS resource required for RSRP measurement, the quantity of CSI processing units required for SINR measurement is determined as 1; and if the number of measurement times of the RS resource required for SINR measurement is greater than the number of measurement times of the RS resource required for RSRP measurement, the quantity of CSI processing units required for SINR measurement is increased.

In an embodiment of the present disclosure, if the calculation time of the CSI processing unit required for SINR measurement is the same as the calculation time of the CSI processing unit required for RSRP measurement, the quantity of CSI processing units required for SINR measurement is increased; and if the calculation time of the CSI processing unit required for SINR measurement is greater than the calculation time of the CSI processing unit required for RSRP measurement, it may be determined that the quantity of CSI processing units required for SINR measurement is 1.

In an embodiment of the present disclosure, a reportQuantity parameter may be set to NULL, and a high-level parameter trs-Info of the RS resource set is not configured, that is, a Tracking Reference Signal (TRS) parameter is not configured.

When the reportQuantity parameter is set to NULL and a TRS parameter trf-Info is not configured for the CSI-RS resource set, the configuration information may be used to indicate that the CMR and the IMR included in the RS resource are used for SINR measurement, and may further be used to indicate that the quantity ratio of the CMR to the IMR is a preset ratio.

When the reportQuantity parameter is set to NULL and a TRS parameter trf-Info is not configured for the CSI-RS resource set, if only one RS resource setting is configured, it may be considered that RSRP measurement is performed on the RS resource. A time of a CSI processing unit occupied by a semi-persistent CSI report is: starting from a first symbol in an earliest transmission opportunity of a periodic or semi-persistent CSI Reference Signal, CSI-RS) resource or Synchronization Signal and PBCH block (SSB) resource for channel measurement of RSRP calculation until Z3' symbols after the last symbol of the latest CSI-RS resource or SSB resource for channel measurement of RSRP calculation in each transmission opportunity; and a time of a CSI processing unit occupied by an aperiodic CSI report is: starting from a first symbol after a Physical Downlink Control CHannel (PDCCH) used to trigger the CSI report until the last symbol after comparing Z3 symbols with Z3' symbols. The Z3 symbols are Z3 symbols starting from a first symbol after the PDCCH used to trigger the CSI report, and the Z3' symbols are Z3' symbols after the last symbol of the latest CSI-RS resource or SSB resource for channel measurement of RSRP calculation.

When the reportQuantity parameter is set to NULL and the TRS parameter trf-Info is not configured for the CSI-RS resource set, if more than one RS resource set is configured, the time of the CSI processing unit occupied by the semi-persistent CSI report is: starting from a first symbol in an earliest transmission opportunity of a periodic or semi-persistent CSI-RS resource or SSB resource for channel measurement of SINR calculation until Zi' symbols after the last symbol of the latest CSI-RS resource or SSB resource for channel measurement of SINR calculation in each transmission opportunity; and the time of the CSI processing unit occupied by the aperiodic CSI report is: starting from a first symbol after the physical downlink control channel PDCCH used to trigger the CSI report until the last symbol after comparing Zi symbols with Zi' symbols. The Zi symbols are Zi symbols starting from a first symbol after the PDCCH used to trigger the CSI report, and the Zi' symbols are Zi' symbols after the last symbol of the latest CSI-RS resource or SSB resource for channel measurement of SINR calculation.

In this embodiment of the present disclosure, the SINR may be an L1-SINR, and the RSRP may be L1-RSRP.

Figure 1:
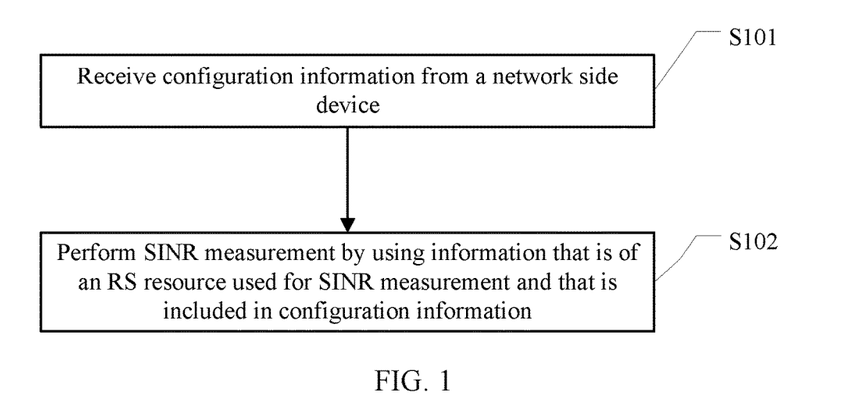
FIG. 1 is a schematic flowchart of an embodiment of an SINR measurement method applied to a terminal device according to the present disclosure.

An embodiment of the present disclosure further provides an SINR measurement method applied to a terminal device. FIG. 1 is a schematic flowchart of an embodiment of an SINR measurement method applied to a terminal device according to the present disclosure. As shown in FIG. 1, the SINR measurement method applied to a terminal device may include the following steps.

S101: Receive configuration information from a network side device, where the configuration information includes information of an RS resource used for SINR measurement.

S102: Perform SINR measurement by using the information that is of the RS resource used for SINR measurement and that is included in the configuration information.

A number of measurement times of the RS resource in the SINR measurement meets a preset rule.

In an embodiment of the present disclosure, the preset rule may include:
a first quantity is not greater than a first preset quantity X, where the first quantity is a number of measurement times of an RS resource in an RS resource setting associated with an SINR report setting.

In an embodiment of the present disclosure, the first quantity may be determined based on at least one of the following items:
a quantity of RS resources with different RS resource identifiers;
a quantity of first RS resources, where the first RS resource is an RS resource measured by using a plurality of pieces of QCL information in the SINR measurement;
a quantity of QCL information used in measuring the first RS resource;
a measurement purpose; and
a mapping relationship between a channel measurement resource CMR and an interference measurement resource IMR.

The measurement purpose may include channel measurement and interference measurement.

In an embodiment of the present disclosure, the first preset quantity X may include:
a maximum quantity of RS resources that a terminal device can support on a serving cell or a bandwidth part; or
a maximum quantity of RS resources that a terminal device can support on all serving cells or all bandwidth parts.

In an embodiment of the present disclosure, the preset rule may include:
a second quantity is not greater than a second preset quantity, where the second quantity is a number of measurement times of an RS resource in each of RS resource settings associated with SINR report settings.

In an embodiment of the present disclosure, the second preset quantity may include any one of the following items:
a maximum quantity of RS resources that a terminal device can support on a serving cell or a bandwidth part;
a maximum quantity of RS resources that are in an RS resource setting and that a terminal device can support on a serving cell or a bandwidth part;
a maximum quantity of RS resources that a terminal device can support on all serving cells or all bandwidth parts; and
a maximum quantity of RS resources that are in an RS resource setting and that a terminal device can support on all serving cells or all bandwidth parts.

In an embodiment of the present disclosure, the preset rule may include:
a third quantity is not greater than a third preset quantity, where the third quantity is a number of measurement times of an RS resource in each RS resource set of RS resource settings associated with SINR report settings.

In an embodiment of the present disclosure, the third preset quantity may include any one of the following items:
a maximum quantity of RS resources that a terminal device can support on a serving cell or a bandwidth part;
a maximum quantity of RS resources that are in an RS resource set and that a terminal device can support on a serving cell or a bandwidth part;
a maximum quantity of RS resources that a terminal device can support on all serving cells or all bandwidth parts; and
a maximum quantity of RS resources that are in an RS resource set and that a terminal device can support on all serving cells or all bandwidth parts.

In an embodiment of the present disclosure, the preset rule may include:
a fourth quantity is not greater than a fourth preset quantity, where the fourth quantity is a number of measurement times of an RS resource in an RS resource setting associated with an SINR report setting within a slot.

In an embodiment of the present disclosure, the fourth preset quantity may include any one of the following items:
a maximum quantity of RS resources that the terminal device can support on all serving cells or all bandwidth parts within a slot; or
a maximum quantity of RS resources that the terminal device can support on a serving cell or a bandwidth part within a slot; or
a maximum quantity of RS resources that the terminal device can support within a slot.

In an embodiment of the present disclosure, the number of measurement times of the RS resource may be a quantity of RS resources.

Then, if the number of measurement times of the RS resource in SINR measurement meets the preset rule, that is, the quantity of RS resources in SINR measurement meets the preset rule.

The first quantity is a number of measurement times of an RS resource in the RS resource setting associated with the SINR report setting, namely, the first quantity is a quantity of RS resources in the RS resource setting associated with the SINR report setting.

The second quantity is a number of measurement times of an RS resource in each of RS resource settings associated with SINR report settings, namely, the second quantity is a quantity of RS resources in each of RS resource settings associated with SINR report settings.

The third quantity is a number of measurement times of an RS resource in each RS resource set of RS resource settings associated with SINR report settings, namely, the third quantity is a quantity of RS resources in each RS resource set of RS resource settings associated with SINR report settings.

The fourth quantity is a number of measurement times of an RS resource in an RS resource setting associated with an SINR report setting within a slot, namely, the fourth quantity is a quantity of RS resources in an RS resource setting associated with an SINR report setting within a slot.

If the network side device instructs the terminal device to perform SINR measurement on 4 beams by using the configuration information, and 4 CMRs and 4 IMRs are configured, the CMRs are in a one-to-one correspondence with the IMRs. A measurement result of a CMR1 is used as channel measurement of the first beam, and a measurement result of an IMR1 is used as interference measurement of the first beam, so as to obtain an SINR measurement result of the first beam. Similarly, a measurement result of a CMR2 is used as channel measurement of the second beam, and a measurement result of an IMR2 is used as interference measurement of the second beam, so as to obtain an SINR measurement result of the second beam. And by analogy. It can be seen that the terminal device needs to measure each RS resource once, and a total quantity of times of measurement is 8 times. At this time, the number of measurement times of the RS resource is the quantity of RS resources.

If the network side device instructs the terminal device to perform SINR measurement on 4 beams by using the configuration information, and 4 CMRs and 4 IMRs are configured, the CMR1 is corresponding to the IMR2, the IMR3, and the IMR4, and a measurement result of the CMR1 is used as channel measurement of the first beam. QCL information of the CMR1 is used to measure the IMR2, the IMR3, and the IMR4, and a sum of measurement results is used as interference measurement of the first beam, so as to obtain the SINR measurement result of the first beam. Similarly, the CMR2 is corresponding to the IMR1, the IMR3, and the IMR4, and a measurement result of the CMR2 is used as channel measurement of the second beam. QCL information of the CMR2 is used to measure the IMR1, the IMR3, and the IMR4, and a sum of measurement results is used as interference measurement of the second beam, so as to obtain the SINR measurement result of the second beam. And by analogy. The total quantity of times of measurement is 4*(1+3)=16 times. The IMR in this embodiment is the quantity of the first RS resources. And all these IMRs are measured by using a plurality of pieces of QCL information. It can be seen that the number of measurement times of the RS resource depends on a mapping relationship between the CMR and the IMR.

In an embodiment of the present disclosure, the RS resource may include a CMR and an IMR.

In an embodiment of the present disclosure, if a quantity ratio of the CMR to the IMR is 1:1, a quantity of CMRs does not exceed X/2; if a quantity ratio of the CMR to the IMR is M:1, a quantity of IMRs does not exceed X/(M+1); and if a quantity ratio of the CMR to the IMR is 1:N, a quantity of CMRs does not exceed X/(N+1), where M and N are positive integers.

According to the SINR measurement method applied to the terminal device provided in the embodiments of the present disclosure, a workload and complexity of the SINR measurement can be reduced by limiting the number of the SINR measurement times.

In an embodiment of the present disclosure, the SINR measurement method applied to the terminal device provided in this embodiment of the present disclosure may further include: determining a calculation time of the CSI processing unit required for SINR measurement.

In an embodiment of the present disclosure, the calculation time of the CSI processing unit required for the SINR measurement may be the same as the calculation time of the CSI processing unit required for the RSRP measurement.

According to the SINR measurement method applied to the terminal device provided in the embodiments of the present disclosure, the calculation time of the CSI processing unit required for the SINR measurement can meet the requirements of the SINR measurement.

In an embodiment of the present disclosure, the SINR measurement method applied to the terminal device provided in this embodiment of the present disclosure may further include: determining a quantity of CSI processing units required for SINR measurement.

In an embodiment of the present disclosure, the quantity of the CSI processing units required for the SINR measurement may be determined as 1.

In an embodiment of the present disclosure, the quantity of CSI processing units required for SINR measurement may further be determined based on a quantity of beams required for SINR measurement, a number of measurement times of the RS resource required for SINR measurement, and/or the calculation time of the CSI processing unit required for SINR measurement.

In an embodiment of the present disclosure, the number of measurement times of the RS resource required for SINR measurement is determined based on at least one of the following items:
 a quantity of RS resources with different RS resource identifiers;
 a quantity of first RS resources, where the first RS resource is an RS resource measured by using a plurality of pieces of QCL information in the SINR measurement;
 a quantity of QCL information used in measuring the first RS resource;
 a measurement purpose; and
 a mapping relationship between the CMR and the IMR.

In an embodiment of the present disclosure, if a quantity ratio of a CMR to an IMR is P:1, it is determined that the quantity of CSI processing units required for SINR measurement as P+1; and if a quantity ratio of the CMR to the IMR is 1:Q, it is determined that the quantity of CSI processing units required for the SINR measurement as Q+1, where P and Q are positive integers.

In an embodiment of the present disclosure, if the quantity of beams required for SINR measurement is the same as the quantity of beams required for RSRP measurement, the quantity of CSI processing units required for SINR measurement is determined as 1, or the quantity of CSI processing units required for SINR measurement is increased.

In an embodiment of the present disclosure, if the number of measurement times of the RS resource required for SINR measurement is the same as the number of measurement times of the RS resource required for RSRP measurement, the quantity of CSI processing units required for SINR measurement is determined as 1; and if the number of measurement times of the RS resource required for SINR measurement is greater than the number of measurement times of the RS resource required for RSRP measurement, the quantity of CSI processing units required for SINR measurement is increased.

In an embodiment of the present disclosure, if the calculation time of the CSI processing unit required for SINR measurement is the same as the calculation time of the CSI processing unit required for RSRP measurement, the quantity of CSI processing units required for SINR measurement is increased; and if the calculation time of the CSI processing unit required for SINR measurement is greater than the calculation time of the CSI processing unit required for RSRP measurement, it may be determined that the quantity of CSI processing units required for SINR measurement is 1.

In an embodiment of the present disclosure, a reportQuantity parameter may be set to NULL, and a high-level parameter trs-Info of the RS resource set is not configured, that is, a TRS parameter is not configured.

When the reportQuantity parameter is set to NULL and a TRS parameter trf-Info is not configured for the CSI-RS resource set, the configuration information may be used to indicate that the CMR and the IMR included in the RS resource are used for SINR measurement, and may further be used to indicate that the quantity ratio of the CMR to the IMR is a preset ratio. In other words, at this time, the terminal device considers that the RS resource configured by the network device is used for SINR measurement; further, the terminal device may also consider that the quantity ratio of the CMR to the IMR included in the RS resource is a preset ratio.

The embodiments of the present disclosure further provide an SINR measurement apparatus applied to a network side device. The SINR measurement apparatus applied to the network side device may include:
  a sending module, configured to send configuration information to a terminal device, where the configuration information includes information of an RS resource used for SINR measurement, and a number of measurement times of the RS resource in the SINR measurement meets a preset rule.

In an embodiment of the present disclosure, the preset rule may include:
  a first quantity is not greater than a first preset quantity X, where the first quantity is a number of measurement times of an RS resource in an RS resource setting associated with an SINR report setting, and X is a positive integer.

In an embodiment of the present disclosure, the first quantity may be determined based on at least one of the following items:
  a quantity of RS resources with different RS resource identifiers;
  a quantity of first RS resources, where the first RS resource is an RS resource measured by using a plurality of pieces of QCL information in the SINR measurement;
  a quantity of QCL information used in measuring the first RS resource;
  a measurement purpose; and
  a mapping relationship between the CMR and the IMR.

In an embodiment of the present disclosure, the first preset quantity X may include:
  a maximum quantity of RS resources that a terminal device can support on a serving cell or a bandwidth part; or
  a maximum quantity of RS resources that a terminal device can support on all serving cells or all bandwidth parts.

In an embodiment of the present disclosure, the preset rule may include:
  a second quantity is not greater than a second preset quantity, where the second quantity is a number of measurement times of an RS resource in each of RS resource settings associated with SINR report settings.

In an embodiment of the present disclosure, the second preset quantity may include any one of the following items:
  a maximum quantity of RS resources that a terminal device can support on a serving cell or a bandwidth part;
  a maximum quantity of RS resources that are in an RS resource setting and that a terminal device can support on a serving cell or a bandwidth part; a maximum quantity of RS resources that a terminal device can support on all serving cells or all bandwidth parts; and
  a maximum quantity of RS resources that are in an RS resource setting and that a terminal device can support on all serving cells or all bandwidth parts.

In an embodiment of the present disclosure, the preset rule may include:
  a third quantity is not greater than a third preset quantity, where the third quantity is a number of measurement times of an RS resource in each RS resource set of RS resource settings associated with SINR report settings.

In an embodiment of the present disclosure, the third preset quantity may include any one of the following items:
  a maximum quantity of RS resources that a terminal device can support on a serving cell or a bandwidth part;
  a maximum quantity of RS resources that are in an RS resource set and that a terminal device can support on a serving cell or a bandwidth part;
  a maximum quantity of RS resources that a terminal device can support on all serving cells or all bandwidth parts; and
  a maximum quantity of RS resources that are in an RS resource set and that a terminal device can support on all serving cells or all bandwidth parts.

In an embodiment of the present disclosure, the preset rule may include:
  a fourth quantity is not greater than a fourth preset quantity, where the fourth quantity is a number of measurement times of an RS resource in an RS resource setting associated with an SINR report setting within a slot.

In an embodiment of the present disclosure, the fourth preset quantity may include any one of the following items:
  a maximum quantity of RS resources that the terminal device can support on all serving cells or all bandwidth parts within a slot;
  a maximum quantity of RS resources that the terminal device can support on a serving cell or a bandwidth part within a slot; and
  a maximum quantity of RS resources that the terminal device can support within a slot.

In an embodiment of the present disclosure, the SINR measurement apparatus applied to the network side device provided in this embodiment of the present disclosure may further include:

a first determination module, configured to determine a calculation time of the channel state information CSI processing unit required for SINR measurement.

In an embodiment of the present disclosure, the calculation time of the CSI processing unit required for the SINR measurement may be the same as the calculation time of the CSI processing unit required for the RSRP measurement.

In an embodiment of the present disclosure, the SINR measurement apparatus applied to the network side device provided in this embodiment of the present disclosure may further include:

a second determination module, configured to determine a quantity of CSI processing units required for SINR measurement.

In an embodiment of the present disclosure, the second determination module may be specifically configured to:

determine the quantity of CSI processing units required for SINR measurement based on a quantity of beams required for SINR measurement, a number of measurement times of the RS resource required for SINR measurement, and/or the calculation time of the CSI processing unit required for SINR measurement.

The number of measurement times of the RS resource required for SINR measurement is determined based on at least one of the following items:

a quantity of RS resources with different RS resource identifiers;
a quantity of first RS resources, where the first RS resource is an RS resource measured by using a plurality of pieces of QCL information in the SINR measurement;
a quantity of QCL information used in measuring the first RS resource;
a measurement purpose; and
a mapping relationship between the CMR and the IMR.

In an embodiment of the present disclosure, the second determination module may be specifically configured to:

determine the quantity of CSI processing units required for SINR measurement as 1.

In an embodiment of the present disclosure, the second determination module may be specifically configured to:

if a quantity ratio of a channel measurement resource CMR to an interference measurement resource IMR included in the RS resource is P:1, determine the quantity of CSI processing units required for SINR measurement as P+1; and
if a quantity ratio of the CMR to the IMR is 1:Q, determine the quantity of CSI processing units required for SINR measurement as Q+1, where P and Q are positive integers.

In an embodiment of the present disclosure, the RS resource may include a CMR and an IMR.

In an embodiment of the present disclosure, if a quantity ratio of the CMR to the IMR is 1:1, a quantity of CMRs does not exceed X/2; if a quantity ratio of the CMR to the IMR is M:1, a quantity of IMRs does not exceed X/(M+1); and if a quantity ratio of the CMR to the IMR is 1:N, a quantity of CMRs does not exceed X/(N+1), where M and N are positive integers.

In an embodiment of the present disclosure, the configuration information may include: a reportQuantity parameter being set to NULL.

In an embodiment of the present disclosure, the configuration information is used to indicate that the CMR and the IMR included in the RS resource are used for SINR measurement, and/or, used to indicate that the quantity ratio of the CMR to the IMR is a preset ratio.

Figure 2:
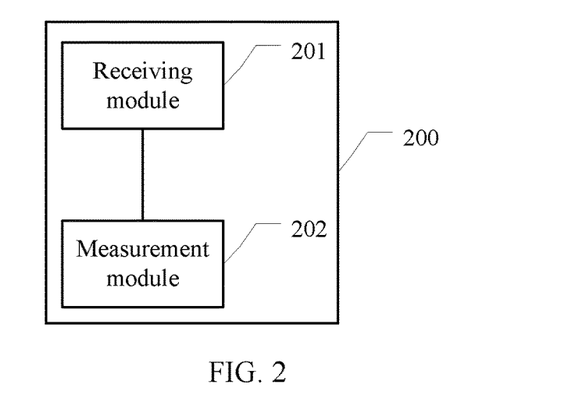
FIG. 2 is a schematic structural diagram of an embodiment of an SINR measurement apparatus applied to a terminal device according to the present disclosure.

The embodiments of the present disclosure further provide an SINR measurement apparatus applied to a terminal device. FIG. 2 is a schematic structural diagram of an embodiment of an SINR measurement apparatus applied to a terminal device according to the present disclosure. An SINR measurement apparatus 200 applied to a terminal device may include:

a receiving module 201, configured to receive configuration information from a network side device, where the configuration information includes information of an RS resource used for SINR measurement; and
a measurement module 202, configured to perform SINR measurement by using the information that is of the RS resource used for SINR measurement and that is included in the configuration information.

A number of measurement times of the RS resource in the SINR measurement meets a preset rule.

In an embodiment of the present disclosure, the preset rule may include:

a first quantity is not greater than a first preset quantity, where the first quantity is a number of measurement times of an RS resource in an RS resource setting associated with an SINR report setting.

In an embodiment of the present disclosure, the first quantity may be determined based on at least one of the following items:

a quantity of RS resources with different RS resource identifiers;
a quantity of first RS resources, where the first RS resource is an RS resource measured by using a plurality of pieces of QCL information in the SINR measurement;
a quantity of QCL information used in measuring the first RS resource;
a measurement purpose; and
a mapping relationship between a channel measurement resource CMR and an interference measurement resource IMR.

The measurement purpose includes channel measurement and interference measurement.

In an embodiment of the present disclosure, the first preset quantity may include:

a maximum quantity of RS resources that a terminal device can support on a serving cell or a bandwidth part; or
a maximum quantity of RS resources that a terminal device can support on all serving cells or all bandwidth parts.

In an embodiment of the present disclosure, the preset rule may include:

a second quantity is not greater than a second preset quantity, where the second quantity is a number of measurement times of an RS resource in each of RS resource settings associated with SINR report settings.

In an embodiment of the present disclosure, the second preset quantity may include any one of the following items:

a maximum quantity of RS resources that a terminal device can support on a serving cell or a bandwidth part;
a maximum quantity of RS resources that are in an RS resource setting and that a terminal device can support on a serving cell or a bandwidth part;

a maximum quantity of RS resources that a terminal device can support on all serving cells or all bandwidth parts; and a maximum quantity of RS resources that are in an RS resource setting and that a terminal device can support on all serving cells or all bandwidth parts.

In an embodiment of the present disclosure, the preset rule may include:

a third quantity is not greater than a third preset quantity, where the third quantity is a number of measurement times of an RS resource in each RS resource set of RS resource settings associated with SINR report settings.

In an embodiment of the present disclosure, the third preset quantity may include any one of the following items:

a maximum quantity of RS resources that a terminal device can support on a serving cell or a bandwidth part;

a maximum quantity of RS resources that are in an RS resource set and that a terminal device can support on a serving cell or a bandwidth part;

a maximum quantity of RS resources that a terminal device can support on all serving cells or all bandwidth parts; and a maximum quantity of RS resources that are in an RS resource set and that a terminal device can support on all serving cells or all bandwidth parts.

In an embodiment of the present disclosure, the preset rule may include:

a fourth quantity is not greater than a fourth preset quantity, where the fourth quantity is a number of measurement times of an RS resource in an RS resource setting associated with an SINR report setting within a slot.

In an embodiment of the present disclosure, the fourth preset quantity may include any one of the following items:

a maximum quantity of RS resources that the terminal device can support on all serving cells or all bandwidth parts within a slot;

a maximum quantity of RS resources that the terminal device can support on a serving cell or a bandwidth part within a slot; and a maximum quantity of RS resources that the terminal device can support within a slot.

In an embodiment of the present disclosure, the SINR measurement apparatus 200 applied to the terminal device provided in this embodiment of the present disclosure may further include:

a third determination module, configured to determine a calculation time of the CSI processing unit required for SINR measurement.

In an embodiment of the present disclosure, the calculation time of the CSI processing unit required for the SINR measurement may be the same as the calculation time of the CSI processing unit required for the RSRP measurement.

In an embodiment of the present disclosure, the SINR measurement apparatus 200 applied to the terminal device provided in this embodiment of the present disclosure may further include:

a fourth determination module, configured to determine a quantity of CSI processing units required for SINR measurement.

In an embodiment of the present disclosure, the fourth determination module may be specifically configured to:

determine the quantity of CSI processing units required for SINR measurement based on a quantity of beams required for SINR measurement, a number of measurement times of the RS resource required for SINR measurement, and/or the calculation time of the CSI processing unit required for SINR measurement.

The number of measurement times of the RS resource required for SINR measurement is determined based on at least one of the following items:

a quantity of RS resources with different RS resource identifiers;

a quantity of first RS resources, where the first RS resource is an RS resource measured by using a plurality of pieces of QCL information in the SINR measurement;

a quantity of QCL information used in measuring the first RS resource;

a measurement purpose; and a mapping relationship between the CMR and the IMR.

In an embodiment of the present disclosure, the fourth determination module may be specifically configured to:

determine the quantity of CSI processing units required for SINR measurement as 1.

In an embodiment of the present disclosure, the fourth determination module may be specifically configured to:

if a quantity ratio of a channel measurement resource CMR to an interference measurement resource IMR included in the RS resource is P:1, determine the quantity of CSI processing units required for SINR measurement as P+1; and if a quantity ratio of the CMR to the IMR is 1:Q, determine the quantity of CSI processing units required for SINR measurement as Q+1, where P and Q are positive integers.

In an embodiment of the present disclosure, the RS resource includes a CMR and an IMR.

In an embodiment of the present disclosure, if a quantity ratio of the CMR to the IMR is 1:1, a quantity of CMRs does not exceed X/2; if a quantity ratio of the CMR to the IMR is M:1, a quantity of IMRs does not exceed X/(M+1); and if a quantity ratio of the CMR to the IMR is 1:N, a quantity of CMRs does not exceed X/(N+1), where M and N are positive integers.

In an embodiment of the present disclosure, the configuration information may include: a reportQuantity parameter being set to NULL.

In an embodiment of the present disclosure, the configuration information is used to indicate that the CMR and the IMR included in the RS resource are used for SINR measurement, and/or, used to indicate that the quantity ratio of the CMR to the IMR is a preset ratio.

An embodiment of the present disclosure further provides a network side device, including: a processor, a memory, and a computer program stored in the memory and executable on the processor. When the computer program is executed by the processor, the processes of the embodiments of the SINR measurement method applied to the network side device are implemented, and a same technical effect can be achieved. To avoid repetition, details are not described herein again.

Figure 3:
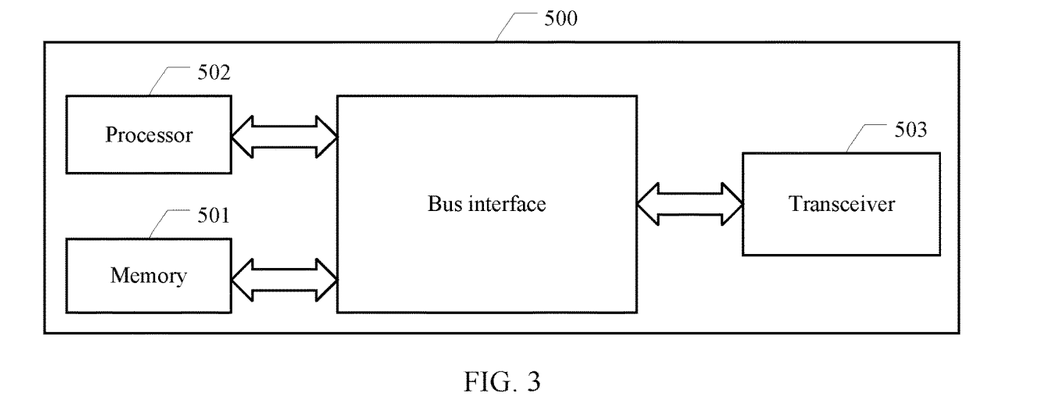
FIG. 3 is a schematic diagram of a hardware structure of an example of a network side device according to the present disclosure.

FIG. 3 is a schematic diagram of a hardware structure of an example of a network side device according to the present disclosure. The network side device 500 includes: a memory 501, a processor 502, a transceiver 503, and a computer program stored in the memory 501 and executable on the processor 502.

The transceiver 503 may be configured to send configuration information to a terminal device, where the configuration information includes information of an RS resource used for SINR measurement, and a number of measurement times of the RS resource in the SINR measurement meets a preset rule.

In FIG. 3, a bus architecture may include any quantity of interconnected buses and bridges, and specifically links various circuits of one or more processors represented by the processor 502 and a memory represented by the memory 501. The bus architecture may further link various other circuits such as those of a peripheral device, a voltage regulator, and a power management circuit. These are well known in the art, and therefore are not further described in this specification. The bus interface provides an interface. The transceiver 503 may be a plurality of elements, to be specific, include a transmitter and a transceiver, and provide a unit configured to communicate with various other apparatuses on a transmission medium, and is configured to receive and send data under the control of the processor 502. The processor 502 is responsible for bus architecture management and general processing. The memory 501 may store data used by the processor 502 when the processor 502 performs an operation.

This embodiment of the present disclosure further provides a terminal device, including: a processor, a memory, and a computer program stored in the memory and executable on the processor. When the computer program is executed by the processor, the foregoing processes of the SINR measurement method embodiment applied to the terminal device are implemented, and a same technical effect can be achieved. To avoid repetition, details are not described herein again.

Figure 4:
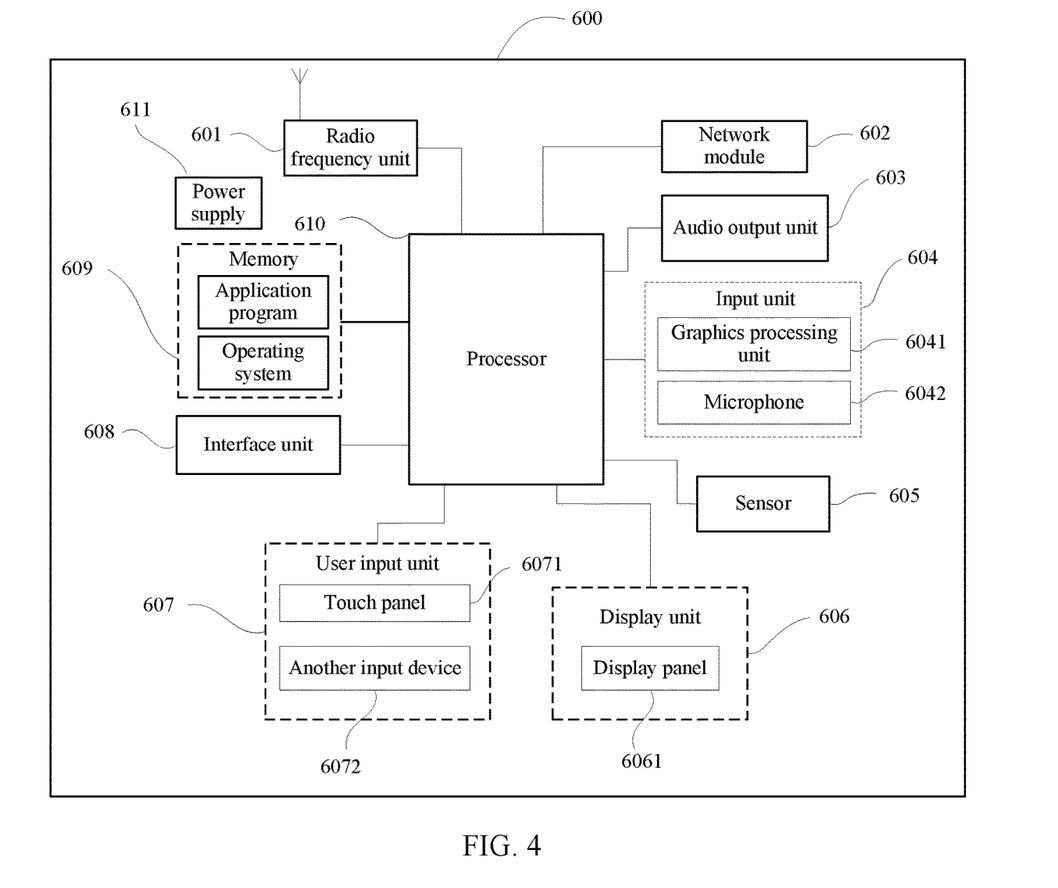
FIG. 4 is a schematic diagram of a hardware structure of an example of a terminal device according to the present disclosure.

FIG. 4 is a schematic diagram of a hardware structure of an example of a terminal device according to the present disclosure. The terminal device 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. It can be understood by a person skilled in the art that, the terminal device structure shown in FIG. 4 does not constitute any limitation on the terminal device, and the terminal device may include more or fewer components than those shown in the figure, or combine some components, or have different component arrangements. In this embodiment of the present disclosure, the terminal device includes but is not limited to a mobile phone, a tablet computer, a notebook computer, a palmtop computer, an in-vehicle terminal, a wearable device, a pedometer, and the like.

The radio frequency unit 601 is configured to receive configuration information from a network side device, where the configuration information includes information of an RS resource used for SINR measurement.

The processor 610 is a control center of the terminal device, is connected to each part of the entire terminal device by using various interfaces and lines, and performs various functions of the terminal device and data processing by running or executing the software program and/or the module that are/is stored in the memory 609 and invoking data stored in the memory 609, to perform overall monitoring on the terminal device. The processor 610 may include one or more processing units. In some embodiments, an application processor and a modem processor may be integrated into the processor 610. The application processor mainly processes an operating system, a user interface, an application, and the like. The modem processor mainly processes wireless communication. It may be understood that, alternatively, the modem processor may not be integrated into the processor 610.

The memory 609 may be configured to store software programs and various data. The memory 609 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 609 may include a high-speed random access memory, and may further include a non-volatile memory such as at least one magnetic disk storage device, a flash memory device, or another volatile solid-state storage device.

In this embodiment, the processor 610 may execute the software program stored in the memory 609 to execute each process of the embodiments of the SINR measurement method applied to the terminal device. For example, the processor 610 is configured to perform SINR measurement by using the information that is of the RS resource used for SINR measurement and that is included in the configuration information, where a number of measurement times of the RS resource in the SINR measurement meets a preset rule.

According to the embodiments of the present disclosure, a workload and complexity of the SINR measurement can be reduced by limiting the number of measurement times of the RS resource in the SINR measurement. In addition, the calculation time and the quantity of CSI processing units required for the SINR measurement can also be determined, so that a determined calculation time and quantity of CSI processing units required for the SINR report can meet requirements of the SINR measurement.

It should be understood that, in this embodiment of the present disclosure, the radio frequency unit 601 may be configured to receive and transmit information, or receive and transmit signals during a call. Specifically, the radio frequency unit 601 receives downlink data from a base station, and transmits the downlink data to the processor 610 for processing; and in addition, transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with another device by using a wireless communications system and network.

The terminal device provides wireless broadband Internet access for the user by using the network module 602, for example, helping the user to send and receive an e-mail, brows a web page, and access streaming media.

The audio output unit 603 may convert audio data received by the radio frequency unit 601 or the network module 602 or stored in the memory 609 into an audio signal, and output the audio signal into sound. In addition, the audio output unit 603 may further provide an audio output (for example, a call signal received voice, or a message received voice) related to a specific function implemented by the terminal device 600. The audio output unit 603 includes a loudspeaker, a buzzer, a receiver, and the like.

The input unit 604 is configured to receive an audio signal or a video signal. The input unit 604 may include a Graphics Processing Unit (GPU) 6041 and a microphone 6042. The graphics processing unit 6041 processes image data of a static image or video obtained by an image capture apparatus (such as, a camera) in a video capture mode or an image capture mode. A processed image frame may be displayed on the display unit 606. The image frame processed by the graphics processing unit 6041 may be stored in the memory 609 (or another storage medium) or sent by using the radio frequency unit 601 or the network module 602. The microphone 6042 may receive a sound and can process such a sound into audio data. The processed audio data may be converted, in a call mode, into a format that may be sent to a mobile communication base station by using the radio frequency unit 601 for output.

The terminal device 600 further includes at least one sensor 605, such as an optical sensor, a motion sensor, and other sensors. Specifically, the light sensor includes an ambient light sensor and a proximity sensor. The ambient light sensor may adjust luminance of the display panel 6061 based on brightness of ambient light. The proximity sensor may turn off the display panel 6061 and/or backlight when the terminal device 600 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein again.

The display unit 606 is configured to display information entered by a user or information provided for a user. The display unit 606 may include the display panel 6061, and the display panel 6061 may be configured in a form of a Liquid Crystal Display (LCD), an Organic Light-Emitting Diode (OLED), or the like.

The user input unit 607 may be configured to receive input digit or character information, and generate a key signal input related to a user setting and function control of the terminal device. Specifically, the user input unit 607 includes a touch panel 6071 and another input device 6072. The touch panel 6071 is also referred to as a touchscreen, and may collect a touch operation of the user on or near the touch panel (for example, an operation performed on or near the touch panel 6071 by the user by using any appropriate object or accessory such as a finger or a stylus). The touch panel 6071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 610, and receives and executes a command sent by the processor 610. In addition, the touch panel 6071 may be implemented by various types, such as a resistive type, a capacitive type, an infrared type, a surface acoustic wave type, or the like. In addition to the touch panel 6071, the user input unit 607 may further include another input device 6072. Specifically, the another input device 6072 may include but is not limited to a physical keyboard, function keys (for example, a volume control key and an on/off key), a trackball, a mouse, and a joystick. Details are not described herein again.

Further, the touch panel 6071 may cover the display panel 6061. When detecting a touch operation on or near the touch panel 6071, the touch panel 6071 transmits the touch operation to the processor 610 to determine a type of a touch event, and then the processor 610 provides corresponding visual output on the display panel 6061 based on the type of the touch event. In FIG. 4, although the touch panel 6071 and the display panel 6061 are used as two independent parts to implement input and output functions of the terminal device, in some embodiments, the touch panel 6071 and the display panel 6061 may be integrated to implement the input and output functions of the terminal device. This is not specifically limited herein.

The interface unit 608 is an interface for connecting an external apparatus with the terminal device 600. For example, the external apparatus may include a wired or wireless headset port, an external power supply (or a battery charger) port, a wired or wireless data port, a storage card port, a port configured to connect to an apparatus having an identification module, an audio input/output (I/O) port, a video I/O port, a headset port, and the like. The interface unit 608 may be configured to receive an input (for example, data information or power) from an external apparatus and transmit the received input to one or more elements in the terminal device 600, or transmit data between the terminal device 600 and the external apparatus.

The terminal device 600 may further include the power supply 611 (such as a battery) that supplies power to each component. In some embodiments, the power supply 611 may be logically connected to the processor 610 by using a power management system, to implement functions such as charging, discharging, and power consumption management by using the power management system.

In addition, the terminal device 600 includes some function modules not shown, and details are not described herein again.

An embodiment of the present disclosure further provides a computer-readable storage medium. The computer-readable storage medium stores computer program instructions. When the computer program instructions are executed by a processor, processes of the SINR measurement method embodiment applied to the terminal device and provided in the embodiments of the present disclosure are implemented, or processes of the SINR measurement method embodiment applied to the network side device and provided in the embodiments of the present disclosure are implemented, and a same technical effect can be achieved. To avoid repetition, details are not described herein again. An example of the computer-readable storage medium includes a non-transitory computer-readable storage medium, such as a Read-Only Memory (ROM), a Random Access Memory (RAM), a magnetic disk, or an optical disc.

The foregoing describes the aspects of the present disclosure with reference to flowcharts and/or block diagrams of the method, the apparatus (system), and the computer program product according to the embodiments of the present disclosure. It should be understood that each block in the flowchart and/or block diagram and a combination of blocks in the flowchart and/or block diagram may be implemented by a computer program instruction. These computer program instructions may be provided for a general-purpose computer, a dedicated computer, or a processor of another programmable data processing apparatus to generate a machine, so that when these instructions are executed by the computer or the processor of the another programmable data processing apparatus, specific functions/actions in one or more blocks in the flowcharts and/or in the block diagrams are implemented. The processor may be but is not limited to a general purpose processor, a dedicated processor, a special application processor, or a field programmable logic circuit. It should be further understood that each block in the block diagram or the flowchart and a combination of blocks in the block diagram or the flowchart may be implemented by using dedicated hardware that performs a specified function or operation, or may be implemented by using a combination of dedicated hardware and a computer instruction.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. An element limited by "includes a . . . " does not, without more constraints, preclude the presence of additional identical elements in the process, method, article, or apparatus that includes the element.

The embodiments of the present disclosure are described above with reference to the accompanying drawings, but the present disclosure is not limited to the foregoing specific implementations. The foregoing implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

The invention claimed is:

1. A signal to interference plus noise ratio measurement method, comprising:
   receiving configuration information from a network side device, wherein the configuration information comprises information of a Reference Signal (RS) resource used for a Signal to Interference plus Noise Ratio (SINR) measurement; and
   performing the SINR measurement by using the information of the RS resource, wherein a number of measurement times of the RS resource in the SINR measurement meets a preset rule.

2. The signal to interference plus noise ratio measurement method according to claim 1, wherein the preset rule comprises:
   a first quantity is not greater than a first preset quantity X, wherein the first quantity is a number of measurement times of an RS resource in an RS resource setting associated with an SINR report setting, and X is a positive integer.

3. The signal to interference plus noise ratio measurement method according to claim 2, wherein the first quantity is determined based on at least one of the following items:
   a quantity of RS resources with different RS resource identifiers;
   a quantity of first RS resources, wherein the first RS resource is an RS resource measured by using a plurality of pieces of Quasi Co-Location (QCL) information in the SINR measurement;
   a quantity of QCL information used in measuring the first RS resource;
   a measurement purpose; or
   a mapping relationship between a Channel Measurement Resource (CMR) and an Interference Measurement Resource (IMR).

4. The signal to interference plus noise ratio measurement method according to claim 2, wherein the first preset quantity X comprises:
   a maximum quantity of RS resources that a terminal device can support on a serving cell or a bandwidth part; or
   a maximum quantity of RS resources that a terminal device can support on all serving cells or all bandwidth parts.

5. The signal to interference plus noise ratio measurement method according to claim 2, wherein the RS resource comprises:
   a CMR and an IMR.

6. The signal to interference plus noise ratio measurement method according to claim 1, wherein the preset rule comprises:
   a second quantity is not greater than a second preset quantity, wherein the second quantity is a number of measurement times of an RS resource in each of RS resource settings associated with SINR report settings, wherein the second preset quantity comprises at least one of the following items:
   a maximum quantity of RS resources that a terminal device can support on a serving cell or a bandwidth part;
   a maximum quantity of RS resources that are in an RS resource setting and that a terminal device can support on a serving cell or a bandwidth part;
   a maximum quantity of RS resources that a terminal device can support on all serving cells or all bandwidth parts; or
   a maximum quantity of RS resources that are in an RS resource setting and that a terminal device can support on all serving cells or all bandwidth parts.

7. The signal to interference plus noise ratio measurement method according to claim 1, wherein the preset rule comprises:
   a third quantity is not greater than a third preset quantity, wherein the third quantity is a number of measurement times of an RS resource in each RS resource set of RS resource settings associated with SINR report settings, wherein the third preset quantity comprises at least one of the following items:
   a maximum quantity of RS resources that a terminal device can support on a serving cell or a bandwidth part;
   a maximum quantity of RS resources that are in an RS resource set and that a terminal device can support on a serving cell or a bandwidth part;
   a maximum quantity of RS resources that a terminal device can support on all serving cells or all bandwidth parts; or
   a maximum quantity of RS resources that are in an RS resource set and that a terminal device can support on all serving cells or all bandwidth parts.

8. The signal to interference plus noise ratio measurement method according to claim 1, wherein the preset rule comprises:
   a fourth quantity is not greater than a fourth preset quantity, wherein the fourth quantity is a number of measurement times of an RS resource in an RS resource setting associated with an SINR report setting within a slot.

9. The signal to interference plus noise ratio measurement method according to claim 8, wherein the fourth preset quantity comprises at least one of the following items:
   a maximum quantity of RS resources that the terminal device can support on all serving cells or all bandwidth parts within a slot;
   a maximum quantity of RS resources that the terminal device can support on a serving cell or a bandwidth part within a slot; or
   a maximum quantity of RS resources that the terminal device can support within a slot.

10. The signal to interference plus noise ratio measurement method according to claim 1, wherein the method further comprises:
  determining a calculation time of a Channel State Information (CSI) processing unit required for SINR measurement, wherein the determining the calculation time of the CSI processing unit required for the SINR measurement comprises:
  determining the calculation time of the CSI processing unit required for the SINR measurement is a calculation time of a CSI processing unit required for Reference Signal Received Power (RSRP) measurement.

11. The signal to interference plus noise ratio measurement method according to claim 1, wherein the method further comprises:
  determining a quantity of CSI processing units required for SINR measurement.

12. The signal to interference plus noise ratio measurement method according to claim 11, wherein the determining the quantity of the CSI processing units required for the SINR measurement comprises:
  determining the quantity of the CSI processing units required for the SINR measurement as 1; or
  wherein the determining the quantity of the CSI processing units required for the SINR measurement comprises:
  in response to a quantity ratio of a CMR to an IMR comprised in the RS resource being P:1, determining the quantity of the CSI processing units required for the SINR measurement as P+1, wherein P is a positive integer; and
  in response to the quantity ratio of the CMR to the IMR being 1:Q, determining the quantity of the CSI processing units required for the SINR measurement as Q+1, wherein Q is a positive integer.

13. The signal to interference plus noise ratio measurement method according to claim 1, wherein the configuration information comprises: a report quantity parameter being set to NULL.

14. The signal to interference plus noise ratio measurement method according to claim 13, wherein the configuration information is used to indicate that a CMR and an IMR comprised in the RS resource are used for the SINR measurement, or used to indicate that a quantity ratio of the CMR to the IMR is a preset ratio.

15. A terminal device, comprising: a memory, a processor, and a computer program stored in the memory and executable on the processor, wherein the computer program, when executed by the processor, causes the processor to implement a signal to interference plus noise ratio measurement method, the method comprising:
  receiving configuration information from a network side device, wherein the configuration information comprises information of a Reference Signal (RS) resource used for a Signal to Interference plus Noise Ratio (SINR) measurement; and
  performing the SINR measurement by using the information of the RS resource, wherein a number of measurement times of the RS resource in the SINR measurement meets a preset rule.

16. The terminal device according to claim 15, wherein the preset rule comprises:
  a first quantity is not greater than a first preset quantity X, wherein the first quantity is a number of measurement times of an RS resource in an RS resource setting associated with an SINR report setting, and X is a positive integer.

17. The terminal device according to claim 16, wherein the first preset quantity X comprises:
  a maximum quantity of RS resources that a terminal device can support on a serving cell or a bandwidth part; or
  a maximum quantity of RS resources that a terminal device can support on all serving cells or all bandwidth parts.

18. The terminal device according to claim 15, wherein the preset rule comprises:
  a fourth quantity is not greater than a fourth preset quantity, wherein the fourth quantity is a number of measurement times of an RS resource in an RS resource setting associated with an SINR report setting within a slot.

19. The terminal device to claim 18, wherein the fourth preset quantity comprises at least one of the following items:
  a maximum quantity of RS resources that the terminal device can support on all serving cells or all bandwidth parts within a slot;
  a maximum quantity of RS resources that the terminal device can support on a serving cell or a bandwidth part within a slot; or
  a maximum quantity of RS resources that the terminal device can support within a slot.

20. A non-transitory computer-readable storage medium storing a computer program, when executed by a processor, causes the processor to implement a signal to interference plus noise ratio measurement method, the method comprising:
  receiving configuration information from a network side device, wherein the configuration information comprises information of a Reference Signal (RS) resource used for a Signal to Interference plus Noise Ratio (SINR) measurement; and
  performing the SINR measurement by using the information of the RS resource, wherein a number of measurement times of the RS resource in the SINR measurement meets a preset rule.

* * * * *